(12) United States Patent
Park et al.

(10) Patent No.: US 11,999,845 B2
(45) Date of Patent: Jun. 4, 2024

(54) THERMOPLASTIC RESIN COMPOSITION AND MOLDED ARTICLE THEREOF

(71) Applicant: LG CHEM, LTD., Seoul (KR)

(72) Inventors: Chun Ho Park, Daejeon (KR); Tae Hoon Kim, Daejeon (KR); Daeun Sung, Daejeon (KR); Yong Hee An, Daejeon (KR); Wangrae Joe, Daejeon (KR); Ho Hoon Kim, Daejeon (KR); Jeongmin Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 262 days.

(21) Appl. No.: 17/762,219

(22) PCT Filed: Dec. 17, 2020

(86) PCT No.: PCT/KR2020/018536
§ 371 (c)(1),
(2) Date: Mar. 21, 2022

(87) PCT Pub. No.: WO2022/019408
PCT Pub. Date: Jan. 27, 2022

(65) Prior Publication Data
US 2022/0340747 A1    Oct. 27, 2022

(30) Foreign Application Priority Data

Jul. 23, 2020 (KR) .................. 10-2020-0091649
Dec. 16, 2020 (KR) .................. 10-2020-0176203

(51) Int. Cl.
*C08L 51/04* (2006.01)
*C08J 5/18* (2006.01)

(52) U.S. Cl.
CPC ............... *C08L 51/04* (2013.01); *C08J 5/18* (2013.01); *C08J 2351/04* (2013.01); *C08L 2205/035* (2013.01)

(58) Field of Classification Search
CPC .... C08F 212/08; C08F 220/14; C08F 220/44; C08J 2333/12; C08J 2351/00;
(Continued)

(56) References Cited

U.S. PATENT DOCUMENTS 6,696,165 B1    2/2004 Bennett et al.
2004/0024122 A1    2/2004 Chang et al.
(Continued)

FOREIGN PATENT DOCUMENTS

CN    1678682 A    10/2005
CN    105658725 A    6/2016
(Continued)

OTHER PUBLICATIONS

Extended European Search Report issued in corresponding European Patent Application No. 20946093.0, dated Nov. 10, 2022.
(Continued)

*Primary Examiner* — Lawrence D Ferguson
(74) *Attorney, Agent, or Firm* — Morgan, Lewis & Bockius LLP (57) ABSTRACT

A thermoplastic resin composition and a molded article including the same are disclosed in which the thermoplastic resin composition includes 100 parts by weight of a base resin including an acrylate-aromatic vinyl compound-vinyl cyanide compound graft copolymer; and 0.5 to 10 parts by weight of a matting agent having a refractive index of 1.46 to 1.53, and a molded article including the thermoplastic resin composition, wherein the thermoplastic resin composition satisfies Equations 1 and 2 below:

$$G \leq 20,$$ [Equation 1]

wherein G denotes the gloss of a sheet having a size of 0.15 T as measured at 60° using a gloss meter, $$Hz < Tt,$$ [Equation 2]

(Continued)

wherein Hz and Tt denote the haze (%) and total light transmittance (%) of a sheet having a size of 0.15 T, respectively.

16 Claims, 3 Drawing Sheets

(58) Field of Classification Search
CPC ............... C08J 2351/04; C08J 2433/12; C08J 2451/00; C08J 5/18; C08L 2205/025; C08L 2205/03; C08L 2205/035; C08L 33/12; C08L 51/003; C08L 51/04; C08L 77/06

See application file for complete search history.

(56) References Cited

U.S. PATENT DOCUMENTS

| | | |
|---|---|---|
| 2016/0032093 A1 | 2/2016 | Abbound et al. |
| 2017/0198132 A1 | 7/2017 | Choi et al. |
| 2017/0369692 A1 | 12/2017 | Park et al. |
| 2018/0230301 A1 | 8/2018 | Choi et al. |
| 2018/0265690 A1 | 9/2018 | Kim et al. |
| 2020/0148876 A1 | 5/2020 | Meng et al. |
| 2022/0010122 A1 | 1/2022 | Sung et al. |

FOREIGN PATENT DOCUMENTS

| | | |
|---|---|---|
| CN | 108034235 A | 5/2018 |
| CN | 108467507 A | 8/2018 |
| CN | 113166520 A | 7/2021 |
| JP | H01121350 A | 5/1989 |
| JP | 2004-323710 A | 11/2004 |
| JP | 2006052378 A | 2/2006 |
| KR | 10-0135397 B1 | 4/1998 |
| KR | 10-2001-0033682 A | 4/2001 |
| KR | 10-2009-0095764 A | 9/2009 |
| KR | 10-2015-0069888 A | 6/2015 |
| KR | 10-1534962 A | 6/2015 |
| KR | 10-1534962 B1 | 7/2015 |
| KR | 10-2017-0025900 A | 3/2017 |
| KR | 10-2017-0062984 A | 6/2017 |
| KR | 10-2017-0066103 A | 6/2017 |
| KR | 10-2018-0075743 A | 7/2018 |
| KR | 10-2019-0073323 A | 6/2019 |
| WO | 2014/146970 A1 | 9/2014 |

OTHER PUBLICATIONS

Office Action dated Nov. 23, 2023 for counterpart Taiwanese Patent Application No. 109146645 Note: KR 2015-0069888 was cited in a prior IDS.
Office Action dated Nov. 24, 2023 for counterpart Chinese Patent Application No. 202080076020.0 Note: KR 2015-0069888 was cited in a prior IDS.
Lei et al., "Synthetic Materials and Auxiliaries thereof", 1994, Handbook of Practical Chemical Materials, 3 pages total (See English Abstract).
First Office Action issued in corresponding Japanese Patent Application No. 2022-521701, dated Jun. 5, 2023. Note: KR 10-2019-0073323 cited therein is cited in an earlier-filed SB08.
International Search Report and Written Opinion issued in corresponding International Patent Application No. PCT/KR2020/018536, dated Apr. 16, 2021.

<CONVENTIONAL HIGH-GLOSS PRODUCT>

<CONVENTIONAL MATTE PRODUCT>

<TRANSPARENT MATTE PRODUCT>

[FIG. 3]

THERMOPLASTIC RESIN COMPOSITION AND MOLDED ARTICLE THEREOF

CROSS-REFERENCE TO RELATED APPLICATIONS

This application claims priority to Korean Patent Application No. 10-2020-0091649, filed on Jul. 23, 2020, and Korean Patent Application No. 10-2020-0176203, re-filed on Dec. 16, 2020, based on the priority of the above patent, in the Korean Intellectual Property Office, the disclosures of each of which are incorporated herein by reference.

TECHNICAL FIELD

The present invention relates to a thermoplastic resin composition and a molded article including the same. More particularly, the present invention relates to a matte thermoplastic resin composition that has mechanical properties, weather resistance, and processability equal or superior to those of conventional ASA resins; has excellent display readability; and is capable of being injected or extruded using a general mold or a general T-die extruder without a separate etching mold, and a molded article including the matte thermoplastic resin composition.

BACKGROUND ART

Acrylate compound-styrene-acrylonitrile copolymers (hereinafter referred to as "ASA resins") have excellent weather resistance, aging resistance, chemical resistance, rigidity, impact resistance, and processability, and thus have been used in various fields, such as electric/electronic products, automobiles, miscellaneous goods, and construction materials.

In particular, customer preference for electrical/electronic products with an appearance that does not have an artificial plastic feel is significantly increasing, but development of matte ASA resins that can meet such demand is insufficient.

Conventionally, by mixing an ASA resin with a crystalline resin such as nylon or by treating the surface of an ASA resin with a separate low-gloss spray, a low-gloss ASA resin has been implemented. However, when low-gloss ASA resins prepared in the described manners are applied to products having external displays, such as air conditioners and refrigerators, display readability, which is one of the important physical properties of these products, is greatly reduced. In addition, even when processing such as extrusion and injection is performed in a separate etching mold, it is difficult to ensure the readability of a matte ASA resin.

RELATED ART DOCUMENTS

Patent Documents

KR 2009-0095764 A

DISCLOSURE

Technical Problem

Therefore, the present invention has been made in view of the above problems, and it is one object of the present invention to provide a matte thermoplastic resin composition that has mechanical properties, weather resistance, and processability equal or superior to those of conventional ASA resins; has excellent display readability; and is capable of being injected or extruded using a general mold or a general T-die extruder without a separate etching mold, and a molded article including the matte thermoplastic resin composition.

The above and other objects can be accomplished by the present invention described below.

Technical Solution

In accordance with one aspect of the present invention, provided is a thermoplastic resin composition including 100 parts by weight of a base resin comprising an acrylate-aromatic vinyl compound-vinyl cyanide compound graft copolymer; and 0.5 to 10 parts by weight of a matting agent having a refractive index of 1.46 to 1.53, wherein the thermoplastic resin composition satisfies Equations 1 and 2 below:

$$G \leq 20, \quad \text{[Equation 1]}$$

wherein G denotes a gloss of a sheet having a size of 0.15 T as measured at 60° using a gloss meter.

$$Hz < Tt, \quad \text{[Equation 2]}$$

wherein Hz and Tt denote haze (%) and total light transmittance (%) of a sheet having a size of 0.15 T, respectively.

In addition, the present invention may provide a thermoplastic resin composition comprising 100 parts by weight of a base resin including an acrylate-aromatic vinyl compound-vinyl cyanide compound graft copolymer; and 0.5 to 10 parts by weight of a matting agent having a refractive index of 1.46 to 1.53, wherein the thermoplastic resin composition has a readability (R) of 1 to 1.4 as measured by Equation 3 below:

$$R = Rc/Ro, \quad \text{[Equation 3]}$$

wherein Rc denotes an area of a brightness peak measured under conditions of width of number stroke: 2 mm, final light quantity: 14 lux, LED light source: 150 lm/W, distance between light source and sheet: contact, and sheet thickness: 0.15 T, and Ro denotes an area of a theoretical brightness peak without light bleeding.

Figure 1:
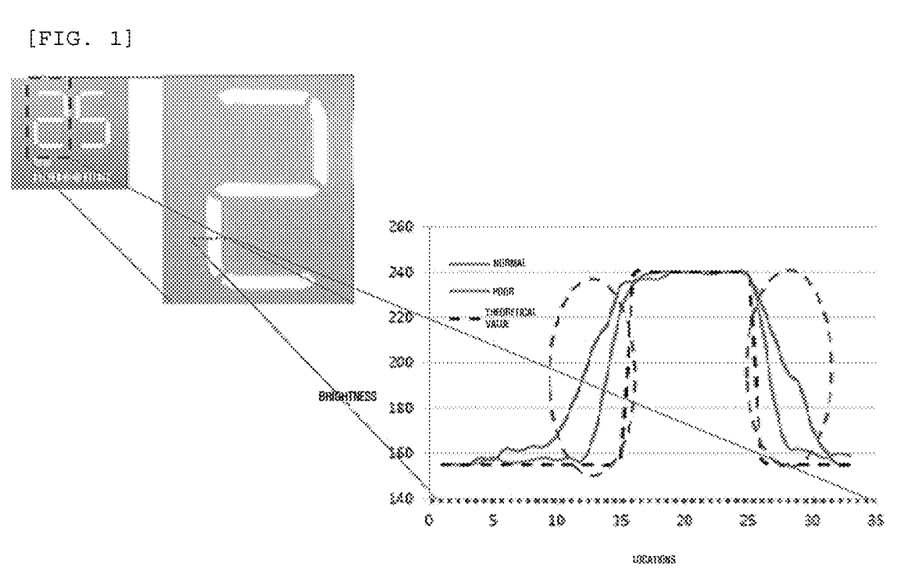
FIG. 1 is a graph showing changes in brightness according to locations, showing a result of measuring display readability.

In this description, the readability (R) value may be defined as the degree of light bleeding occurring at the boundary between the light-emitting portion and the non-light-emitting portion of a display. Referring to FIG. 1, in the case of severe light bleeding (defective), brightness decreases gradually from the light-emitting portion (brightness: 240) to the non-light-emitting portion (brightness: 160). In the case of less light bleeding (normal), brightness decreases sharply from the light-emitting portion (brightness: 240) to the non-light-emitting portion (brightness: 160). In theory, if there is no light bleeding at all (theoretical), there is no light gradient between the light-emitting portion (brightness: 240) and the non-light-emitting portion (brightness: 160). Accordingly, as the degree of light bleeding increases, readability deteriorates and a readability (R) value increases. In FIG. 1, the distance 5 in the x-axis corresponds to about 1 mm. Here, the brightness 160 is the brightness value of a gray film as a reference.

The base resin may comprise 10 to 70% by weight of an acrylate-aromatic vinyl compound-vinyl cyanide compound graft copolymer, 5 to 50% by weight of a polymethacrylate-based resin, and 10 to 50% by weight of a methacrylate-aromatic vinyl compound-vinyl cyanide compound copolymer.

The total light transmittance (Tt) may be 80 to 95%, and the haze (Hz) may be 1 to 90%.

The acrylate-aromatic vinyl compound-vinyl cyanide compound graft copolymer may comprise one or more selected from the group consisting of an acrylate-aromatic vinyl compound-vinyl cyanide compound graft copolymer (i) having a grafting degree of 40% or more and containing 40 to 60% by weight of acrylate rubber having an average particle diameter of 0.05 to 0.15 μm, an acrylate-aromatic vinyl compound-vinyl cyanide compound graft copolymer (ii) having a grafting degree of less than 40% and containing 40 to 60% by weight of acrylate rubber having an average particle diameter of 0.05 to 0.15 μm, and an acrylate-aromatic vinyl compound-vinyl cyanide compound graft copolymer (iii) containing 40 to 60% by weight of acrylate rubber having an average particle diameter of 0.33 to 0.5 μm.

Based on 100% by weight in total of the base resin, the acrylate-aromatic vinyl compound-vinyl cyanide compound graft copolymer (i) may be included in an amount of 30 to 60% by weight, the acrylate-aromatic vinyl compound-vinyl cyanide compound graft copolymer (ii) may be included in an amount of 35 to 65% by weight, and the acrylate-aromatic vinyl compound-vinyl cyanide compound graft copolymer (iii) may be included in an amount of 5 to 30% by weight.

The polymethacrylate-based resin may include 65 to 80% by weight of methacrylate and 20 to 35% by weight of a vinyl cyanide compound.

The polymethacrylate-based resin may have a weight average molecular weight of 50,000 to 200,000 g/mol.

The polymethacrylate-based resin may include one or more selected from the group consisting of a polymethacrylate-based resin (a) having a weight average molecular weight of 30,000 to 90,000 g/mol, a polymethacrylate-based resin (b) having a weight average molecular weight of 100,000 to 200,000 g/mol, and a polymethacrylate-based resin (c) having a weight average molecular weight of greater than 200,000 g/mol and less than or equal to 300,000 g/mol.

Based on 100% by weight in total of the base resin, the polymethacrylate-based resin (a) may be included in an amount of 5 to 30% by weight, the polymethacrylate-based resin (b) may be included in an amount of 5 to 30% by weight, and the polymethacrylate-based resin (c) may be included in an amount of 10 to 50% by weight.

The methacrylate-aromatic vinyl compound-vinyl cyanide compound copolymer may include 65 to 85% by weight of methacrylate, 10 to 30% by weight of an aromatic vinyl compound, and 5 to 10% by weight of a vinyl cyanide compound.

The methacrylate-aromatic vinyl compound-vinyl cyanide compound copolymer may have a weight average molecular weight of 80,000 to 200,000 g/mol.

The matting agent may be a polyamide resin having a refractive index of 1.46 to 1.53.

In accordance with another aspect of the present invention, provided is a molded article including the thermoplastic resin composition.

The molded article may be a film or matte sheet material for hidden displays.

The film or the sheet may have a thickness of 0.05 to 0.5 T.

Advantageous Effects

As apparent from the foregoing, the present invention advantageously provides a matte thermoplastic resin composition that has mechanical properties, weather resistance, and processability equal or superior to those of conventional ASA resins; has excellent display readability; and is capable of being injected or extruded using a general mold or a general T-die extruder without a separate etching mold, and a molded article including the matte thermoplastic resin composition.

BEST MODE

Hereinafter, a thermoplastic resin composition and a molded article including the same according to the present invention will be described in detail.

To realize an air conditioner having a luxurious appearance and to diversify the appearance of an air conditioner, the present inventors conducted studies to develop an ASA resin capable of imparting a matte effect and excellent display readability to products such as air conditioners. As a result of such studies, it was confirmed that, when a specific amount of a matting agent having a refractive index within a specific range was added to an ASA resin and sheet gloss, haze (%), and total light transmittance (%) were adjusted by predetermined interaction equations, an ASA resin having a matte appearance without an artificial plastic feel, having excellent display readability, and capable of being injected using a general mold without a separate etching mold was prepared. Based on these results, the present inventors conducted further studies to complete the present invention.

The thermoplastic resin composition of the present invention includes 100 parts by weight of a base resin including an acrylate-aromatic vinyl compound-vinyl cyanide compound graft copolymer; and 0.5 to 10 parts by weight of a matting agent having a refractive index of 1.46 to 1.53, and satisfies Equations 1 and 2 below. In this case, a matte thermoplastic resin composition that has mechanical properties, weather resistance, and processability equal or superior to those of conventional ASA resins; has excellent display readability; and is capable of being injected using a general mold without a separate etching mold, and a molded article including the matte thermoplastic resin composition may be provided.

$$G \leq 20 \qquad \text{[Equation 1]}$$

In Equation 1, G denotes the gloss of a sheet having a size of 0.15 T as measured at 60° using a gloss meter.

$$Hz < Tt \qquad \text{[Equation 2]}$$

In Equation 2, Hz and Tt denote the haze (%) and total light transmittance (%) of a sheet having a size of 0.15 T, respectively.

As a specific example, the thermoplastic resin composition may satisfy Equation 1a below. In this case, display readability may be excellent while maintaining mechanical properties, weather resistance, and processability, and injection of the thermoplastic resin composition may be performed using a general mold without a separate etching mold.

$$7 \leq G \leq 20 \quad \text{[Equation 1a]}$$

The Tt value is preferably 80 or more, more preferably 85 or more, and the Hz value is preferably 10 or less. Within this range, display readability may be excellent while maintaining mechanical properties, weather resistance, and processability, and injection of the thermoplastic resin composition may be performed using a general mold without a separate etching mold.

In addition, the thermoplastic resin composition of the present invention includes 100 parts by weight of a base resin including an acrylate-aromatic vinyl compound-vinyl cyanide compound graft copolymer; and 0.5 to 10 parts by weight of a matting agent having a refractive index of 1.46 to 1.53, and has a readability (R) of 1 to 1.4 as measured by Equation 3 below. In this case, a matte thermoplastic resin composition that has mechanical properties, weather resistance, and processability equal or superior to those of conventional ASA resins; has excellent display readability; and is capable of being injected using a general mold without a separate etching mold, and a molded article including the matte thermoplastic resin composition may be provided.

$$R = Rc/Ro \quad \text{[Equation 3]}$$

In Equation 3, Rc denotes the area of a brightness peak measured under conditions of width of number stroke: 2 mm, final light quantity: 14 lux, LED light source: 150 lm/W, distance between light source and sheet: contact, and sheet thickness: 0.15 T, and Ro denotes the area of a theoretical brightness peak without light bleeding.

In this description, brightness was calculated using the RGB values of a captured image and a Microsoft Paint tool. With reference to FIG. 1 below, brightness values measured according to locations were displayed, and a graph showing changes in brightness according to locations was obtained. The brightness values are in a range of 0 to 240, 0 means black, and 240 means white.

Hereinafter, each component constituting the thermoplastic resin composition of the present invention will be described in detail as follows.

<Base Resin>

The base resin of the present invention preferably includes an acrylate-aromatic vinyl compound-vinyl cyanide compound graft copolymer, a polymethacrylate-based resin, and a methacrylate-aromatic vinyl compound-vinyl cyanide compound copolymer, more preferably 10 to 70% by weight of an acrylate-aromatic vinyl compound-vinyl cyanide compound graft copolymer, 5 to 50% by weight of a polymethacrylate-based resin, and 10 to 50% by weight of a methacrylate-aromatic vinyl compound-vinyl cyanide compound copolymer.

Acrylate-Aromatic Vinyl Compound-Vinyl Cyanide Compound Graft Copolymers

The acrylate-aromatic vinyl compound-vinyl cyanide compound graft copolymers preferably include one or more selected from the group consisting of an acrylate-aromatic vinyl compound-vinyl cyanide compound graft copolymer (i) having a grafting degree of 40% or more and containing 40 to 60% by weight of acrylate rubber having an average particle diameter of 0.05 to 0.15 μm, an acrylate-aromatic vinyl compound-vinyl cyanide compound graft copolymer (ii) having a grafting degree of less than 40% and containing 40 to 60% by weight of acrylate rubber having an average particle diameter of 0.05 to 0.15 μm, and an acrylate-aromatic vinyl compound-vinyl cyanide compound graft copolymer (iii) containing 40 to 60% by weight of acrylate rubber having an average particle diameter of 0.33 to 0.5 μm. In this case, processability, elongation, surface quality, weather resistance, and transparency may be excellent.

(i) Acrylate-Aromatic Vinyl Compound-Vinyl Cyanide Compound Graft Copolymer

The acrylate-aromatic vinyl compound-vinyl cyanide compound graft copolymer (i) of the present invention is preferably included in an amount of 30 to 60% by weight, more preferably 40 to 60% by weight, still more preferably 40 to 55% by weight, most preferably 45 to 55% by weight based on 100% by weight in total of the base resin. Within this range, processability, elongation, surface quality, weather resistance, and transparency may be excellent.

The acrylate-aromatic vinyl compound-vinyl cyanide compound graft copolymer (i) preferably has a grafting degree of 40% to 55%, more preferably 40% to 50%, still more preferably 40% to 45% Within this range, processability, elongation, surface quality, weather resistance, and transparency may be excellent.

In this description, when grafting degree is measured, graft copolymer powder is dissolved in acetone and stirred for 24 hours, and centrifugation is performed at 20,000 rpm for 3 hours to separate insoluble matter and soluble matter. Then, the obtained insoluble matter is dried for 24 hours, and the weight thereof is measured. Grafting degree is calculated by substituting the obtained weight value into Equation 4 below.

$$\text{Grafting degree (\%)} = [(\text{Content of insoluble matter} - \text{rubber content of graft copolymer})/\text{Rubber content of graft copolymer}] \times 100 \quad \text{[Equation 4]}$$

In this description, unless defined otherwise, content is based on weight.

The acrylate-aromatic vinyl compound-vinyl cyanide compound graft copolymer (i) preferably includes 40 to 60% by weight of acrylate rubber having an average particle diameter of 0.05 to 0.15 μm, 20 to 40% by weight of an aromatic vinyl compound, and 10 to 20% by weight of a vinyl cyanide compound. Within this range, processability, elongation, surface quality, weather resistance, and transparency may be excellent.

As a preferred example, the acrylate-aromatic vinyl compound-vinyl cyanide compound graft copolymer (i) may include 45 to 55% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In this description, a polymer including a compound refers to a polymer prepared by polymerizing the compound, and a unit in the polymerized polymer is derived from the compound.

For example, the acrylate-aromatic vinyl compound-vinyl cyanide compound graft copolymer (i) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

In this description, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In this description, for example, the aromatic vinyl compound may include one or more selected from the group consisting of styrene, α-methylstyrene, m-methylstyrene, p-methylstyrene, and p-tert-butylstyrene, preferably styrene.

In this description, for example, the vinyl cyanide compound may include one or more selected from the group consisting of acrylonitrile, methacrylonitrile, ethylacrylonitrile, and isopropylacrylonitrile, preferably acrylonitrile.

The graft copolymer (i) contains acrylate rubber preferably having an average particle diameter of 0.1 to 0.15 μm, more preferably 0.12 to 0.15 μm, still more preferably 0.12 to 0.14 μm. Within this range, a thermoplastic resin composition having excellent weather resistance, colorability, impact strength, chemical resistance, and surface gloss may be prepared.

In this description, the average particle diameter may be measured by dynamic light scattering, and specifically, may be measured as an intensity value using a Nicomp 380 particle size analyzer (manufacturer: PSS) in a Gaussian mode.

In addition, in this description, the average particle diameter may be an arithmetic average particle diameter in a particle size distribution measured by dynamic light scattering, specifically, a scattering intensity average particle diameter. As a specific measurement example, a sample may be prepared by diluting 0.1 g of latex (TSC: 35 to 50 wt %) 1,000 to 5,000 times with distilled water, and average particle diameter may be measured using flow cells in an auto-dilution manner and in a mode of dynamic light scattering/intensity 300 kHz/intensity-weight Gaussian analysis. In this case, temperature, measurement wavelength, and channel width may be set to 23° C., 632.8 nm, and 10 μsec, respectively.

(ii) Acrylate-Aromatic Vinyl Compound-Vinyl Cyanide Compound Graft Copolymer

The acrylate-aromatic vinyl compound-vinyl cyanide compound graft copolymer (ii) of the present invention is preferably included in an amount of 35 to 65% by weight, more preferably 40 to 65% by weight, still more preferably 50 to 65% by weight, most preferably 55 to 65% by weight based on 100% by weight in total of the base resin. Within this range, processability, elongation, surface quality, weather resistance, and transparency may be excellent.

The acrylate-aromatic vinyl compound-vinyl cyanide compound graft copolymer (ii) preferably has a grafting degree of 20% to 39%, more preferably 25% to 35%, still more preferably 25% to 30% Within this range, processability, elongation, surface quality, weather resistance, and transparency may be excellent.

The acrylate-aromatic vinyl compound-vinyl cyanide compound graft copolymer (ii) preferably includes 40 to 60% by weight of acrylate rubber having an average particle diameter of 0.05 to 0.15 μm, 20 to 40% by weight of an aromatic vinyl compound, and 10 to 20% by weight of a vinyl cyanide compound. Within this range, processability, elongation, surface quality, weather resistance, and transparency may be excellent.

As a preferred example, the acrylate-aromatic vinyl compound-vinyl cyanide compound graft copolymer (ii) may include 45 to 55% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

For example, the acrylate-aromatic vinyl compound-vinyl cyanide compound graft copolymer (ii) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

The graft copolymer (ii) contains acrylate rubber preferably having an average particle diameter of 0.1 to 0.15 μm, more preferably 0.12 to 0.15 μm, still more preferably 0.12 to 0.14 μm. Within this range, a thermoplastic resin composition having excellent weather resistance, colorability, impact strength, chemical resistance, and surface gloss may be prepared.

(iii) Acrylate-Aromatic Vinyl Compound-Vinyl Cyanide Compound Graft Copolymer

The acrylate-aromatic vinyl compound-vinyl cyanide compound graft copolymer (iii) of the present invention is preferably included in an amount of 5 to 30% by weight, more preferably 10 to 30% by weight, still more preferably 10 to 25% by weight, most preferably 15 to 20% by weight based on 100% by weight in total of the base resin. Within this range, weather resistance, fluidity, tensile strength, and impact strength may be excellent.

The acrylate-aromatic vinyl compound-vinyl cyanide compound graft copolymer (iii) preferably includes 40 to 60% by weight of acrylate rubber having an average particle diameter of 0.33 to 0.5 μm, 25 to 45% by weight of an aromatic vinyl compound, and 10 to 20% by weight of a vinyl cyanide compound. Within this range, weather resistance, fluidity, tensile strength, and impact strength may be excellent.

The graft copolymer (iii) contains acrylate rubber preferably having an average particle diameter of 0.35 to 0.5 μm, more preferably 0.38 to 0.5 μm, still more preferably 0.4 to 0.5 μm. Within this range, weather resistance may be good, and fluidity and mechanical strength, such as tensile strength and impact strength, may be excellent.

As a preferred example, the graft copolymer (iii) may include 45 to 55% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

The acrylate-aromatic vinyl compound-vinyl cyanide compound graft copolymer (iii) is preferably included in an amount of 5 to 15% by weight, more preferably 10 to 15% by weight. Within this range, weather resistance, fluidity, tensile strength, and impact strength may be excellent.

For example, the graft copolymer (iii) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

Polymethacrylate-Based Resin

The polymethacrylate-based resin of the present invention preferably includes a methacrylate compound in an amount of 65% by weight or more, more preferably 70% by weight or more, still more preferably 75% by weight or more. Within this range, gloss, hardness, weather resistance, and transparency may be excellent.

The polymethacrylate-based resin preferably includes 65 to 80% by weight of methacrylate and 20 to 35% by weight of a vinyl cyanide compound. Within this range, gloss, hardness, weather resistance, and transparency may be excellent.

The polymethacrylate-based resin preferably has a weight average molecular weight of 50,000 to 200,000 g/mol, more preferably 100,000 to 150,000 g/mol. Within this range, gloss, hardness, weather resistance, and transparency may be excellent.

The polymethacrylate-based resin preferably includes one or more selected from the group consisting of a polymethacrylate-based resin (a) having a weight average molecular weight of 30,000 to 90,000 g/mol, a polymethacrylate-based resin (b) having a weight average molecular weight of 100,000 to 200,000 g/mol, and a polymethacrylate-based resin (c) having a weight average molecular weight of greater than 200,000 g/mol and less than or equal to 300,000 g/mol. In this case, gloss, hardness, weather resistance, and transparency may be excellent.

In this description, unless defined otherwise, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

The polymethacrylate-based resin (a) is preferably included in an amount of 5 to 30% by weight, more preferably 10 to 30% by weight, still more preferably 10 to 25% by weight, most preferably 10 to 20% by weight based on 100% by weight in total of the base resin. Within this range, gloss, hardness, weather resistance, and transparency may be excellent.

The polymethacrylate-based resin (b) is preferably included in an amount of 5 to 30% by weight, more preferably 10 to 30% by weight, still more preferably 10 to 25% by weight, most preferably 10 to 20% by weight based on 100% by weight in total of the base resin. Within this range, gloss, hardness, weather resistance, and transparency may be excellent.

The polymethacrylate-based resin (c) is preferably included in an amount of 10 to 50% by weight, more preferably 10 to 45% by weight, still more preferably 15 to 45% by weight, most preferably 15 to 40% by weight based on 100% by weight in total of the base resin. Within this range, gloss, hardness, weather resistance, and transparency may be excellent.

In this description, the methacrylate compound is preferably an alkyl methacrylate containing an alkyl group having 1 to 15 carbon atoms. As a preferred example, the methacrylate compound may include one or more selected from the group consisting of methyl methacrylate, ethyl methacrylate, butyl methacrylate, 2-ethylbutyl methacrylate, 2-ethylhexyl methacrylate, and lauryl methacrylate, and is more preferably an alkyl methacrylate containing a chain alkyl group having 1 to 4 carbon atoms, still more preferably methyl methacrylate.

For example, the polymethacrylate-based resin may be prepared by solution polymerization, bulk polymerization, emulsion polymerization, or suspension polymerization. Solution polymerization, bulk polymerization, emulsion polymerization, and suspension polymerization commonly practiced in the art to which the present invention pertains may be used in the present invention without particular limitation.

Methacrylate-Aromatic Vinyl Compound-Vinyl Cyanide Compound Copolymer

The methacrylate-aromatic vinyl compound-vinyl cyanide compound copolymer of the present invention preferably includes 65 to 85% by weight of methacrylate, 10 to 30% by weight of an aromatic vinyl compound, and 5 to 10% by weight of a vinyl cyanide compound, more preferably 65 to 75% by weight of methacrylate, 15 to 25% by weight of an aromatic vinyl compound, and 5 to 10% by weight of a vinyl cyanide compound. Within this range, weather resistance, fluidity, tensile strength, and impact strength may be excellent, and due to a low surface roughness value, a soft, aesthetically pleasing effect may be implemented.

The methacrylate-aromatic vinyl compound-vinyl cyanide compound copolymer is preferably a methyl methacrylate-styrene-acrylonitrile copolymer. In this case, weather resistance may be excellent, and due to a low surface roughness value, a soft, aesthetically pleasing effect may be implemented.

The methacrylate-aromatic vinyl compound-vinyl cyanide compound copolymer preferably has a weight average molecular weight of 80,000 to 200,000 g/mol, more preferably 100,000 to 150,000 g/mol, still more preferably 120,000 to 140,000 g/mol. Within this range, weather resistance, fluidity, tensile strength, and impact strength may be excellent, and due to a low surface roughness value, a soft, aesthetically pleasing effect may be implemented.

The methacrylate-aromatic vinyl compound-vinyl cyanide compound copolymer preferably includes one or more selected from the group consisting of a methyl methacrylate-styrene-acrylonitrile copolymer having a weight average molecular weight of 70,000 to 90,000 g/mol and a methyl methacrylate-styrene-acrylonitrile copolymer having a weight average molecular weight of 120,000 to 140,000 g/mol. In this case, transparency and weather resistance may be excellent.

For example, the methyl methacrylate-styrene-acrylonitrile copolymer may be prepared by solution polymerization, bulk polymerization, emulsion polymerization, or suspension polymerization. Solution polymerization, bulk polymerization, emulsion polymerization, and suspension polymerization commonly practiced in the art to which the present invention pertains may be used in the present invention without particular limitation.

<Matting Agent>

For example, the matting agent of the present invention may have a refractive index of 1.46 to 1.53, preferably 1.47 to 1.53, more preferably 1.50 to 1.53, still more preferably 1.51 to 1.53. Within this range, a matte thermoplastic resin composition that has mechanical properties, weather resistance, and processability equal or superior to those of conventional ASA resins; has excellent display readability; and is capable of being injected using a general mold without a separate etching mold may be provided.

In this description, refractive index may be measured at 25° C. using a REICHERT MARK 2 PLUS according to ASTM method D 542-50.

The matting agent preferably includes one or more selected from the group consisting of PMMA-based matting agents and polyamides, more preferably polyamides. The polyamide refers to a thermoplastic polymer including amide bonds, and as a specific example, may include one or more selected from the group consisting of polyamide 6, polyamide (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I. Preferably, the polyamide is polyamide 6, polyamide 6.6, or a mixture thereof, more preferably polyamide 66 (PA 6.6).

For example, the polyamide may have a melting point of 230° C. or higher, preferably 240° C. or higher, more preferably 250° C. or higher, still more preferably 260 to 270° C.

For example, the polyamide may have a relative viscosity (96% sulfuric acid solution) of 2.0 to 4.0, preferably 2.0 to 3.5, more preferably 2.0 to 3.0, still more preferably 2.4 to 2.7.

In this description, relative viscosity may be measured using an Ubbelohde viscometer by a sulfuric acid method according to ISO 307.

The matting agent is preferably included in an amount of 1 to 10% by weight, more preferably 2 to 10% by weight, still more preferably 3 to 8% by weight, most preferably 3 to 5% by weight. Within this range, low gloss may be implemented, thereby increasing a matte effect. In addition, physical property balance may be excellent.

PMMA-based matting agents having a refractive index according to the present invention, which are commonly used in the art to which the present invention pertains, may be used as the PMMA-based matting agent of the present invention without particular limitation.

Polymerization methods commonly practiced in the art to which the present invention pertains may be used as a method of preparing the PMMA-based matting agent and the polyamide without particular limitation. In addition, commercially available PMMA-based matting agents and polyamides may be used when the commercially available PMMA-based matting agents and polyamides meet the definition of the PMMA-based matting agent and polyamide according to the present invention.

<Thermoplastic Resin Composition>

The thermoplastic resin composition of the present invention preferably satisfies Equations 1 and 2 below. In this case, the thermoplastic resin composition may have excellent display readability while having mechanical properties, weather resistance, and processability equal or superior to those of conventional ASA resins, and may be injected using a general mold without a separate etching mold.

$$G \leq 20 \quad \text{[Equation 1]}$$

In Equation 1, G denotes the gloss of a sheet having a size of 0.15 T as measured at 60° using a gloss meter.

$$Hz < Tt \quad \text{[Equation 2]}$$

In Equation 2, Hz and Tt denote the haze (%) and total light transmittance (%) of a sheet having a size of 0.15 T, respectively.

As a specific example, the thermoplastic resin composition may satisfy Equations 1a and 2a below.

$$7 \leq G \leq 20 \quad \text{[Equation 1a]}$$

$$Hz + 3.0 < Tt \quad \text{[Equation 2a]}$$

In addition, as a more specific example, the thermoplastic resin composition may satisfy Equations 1b and 2a below.

$$7 \leq G \leq 15 \quad \text{[Equation 1b]}$$

$$Hz + 3.0 < Tt \quad \text{[Equation 2a]}$$

The thermoplastic resin composition preferably has a total light transmittance (Tt) of 80 to 95%, more preferably 85 to 95%, still more preferably 87 to 91%, and preferably has a haze (Hz) of 1 to 90%, more preferably 2 to 90%, still more preferably 2 to 88%. Within this range, the thermoplastic resin composition may have excellent display readability while having mechanical properties, weather resistance, and processability equal or superior to those of conventional ASA resins, and may be injected using a general mold without a separate etching mold.

The thermoplastic resin composition preferably has a readability (R) of 1 to 1.4, more preferably 1.0 to 1.3, still more preferably 1.0 to 1.2 as measured by Equation 3 below. Within this range, display readability may be excellent while maintaining mechanical properties, weather resistance, and processability equal or superior to those of conventional ASA resins.

$$R = Rc/Ro \quad \text{[Equation 3]}$$

In Equation 3, Rc denotes the area of a brightness peak measured under conditions of width of number stroke: 2 mm, final light quantity: 14 lux, LED light source: 150 lm/W, distance between light source and sheet: contact, and sheet thickness: 0.15 T, and Ro denotes the area of a theoretical brightness peak without light bleeding.

The thermoplastic resin composition preferably has an average surface roughness (Ra) of 0.5 to 3, more preferably 1 to 2.7, still more preferably 1.5 to 2.6, still more preferably 1.8 to 2.3 as measured at 5 points using an optical profiler system. Within this range, a matte effect may be efficiently implemented, and softness, luxuriousness, and naturalness may be improved.

In this description, when surface roughness (Ra) is measured, a thermoplastic resin composition is prepared into a sheet having a thickness of 0.15 T as described in Examples below, and surface roughness values for 5 points of the sheet are measured using an optical profiler system (NV-2700, Nano System Co., Ltd.) under analysis conditions of objective lens (10×)×ocular lens (1×) (F.O.V: 628 μm×471 μm), mode: WSI Envelope, and scan range: ±10 μm. The average value of the measured surface roughness values is the surface roughness (Ra) of the thermoplastic resin composition. In this case, the unit of surface roughness (Ra) is μm.

For example, the thermoplastic resin composition may have a weather resistance (ΔE) of 5.0 or less, preferably 4.9 or less, more preferably 4.0 or less, still more preferably 3.5 or less as measured for 2,000 hours according to SAE J1960.

For example, the thermoplastic resin composition may have a melt index (MI) (220° C., load: 10 kg) of 4 g/10 min or more, preferably 5 g/10 min or more, more preferably 6 g/10 min or more, still more preferably 9 g/10 min or more, as a specific example, 4 to 15 g/10 min, as measured according to ASTM D1238.

The thermoplastic resin composition preferably has an elongation (⅛ inch) of 20 or more, more preferably 25 or more, as a specific example, 20 to 40, as a preferred example, 29 to 38, as measured according to ASTM D638.

The thermoplastic resin composition preferably has a hardness of 70 or more, more preferably 75 or more, as a specific example, 70 to 120, as a preferred example, 78 to 116, as measured according to ASTM D785.

The thermoplastic resin composition preferably has an injection gloss (3.17 T) of 50 or less, more preferably 45 or less, as a specific example, 20 to 50, as a preferred example, 23 to 42, as measured at 60° using a gloss meter VG7000.

The thermoplastic resin composition preferably has an Izod impact strength (¼ inch) of 4 kg·cm/cm or more, as a specific example, 4 to 7 kg·cm/cm, as measured according to ASTM 256.

When necessary, the thermoplastic resin composition may further include 0.01 to 5 parts by weight, 0.05 to 3 parts by weight, 0.1 to 2 parts by weight, or 0.5 to 1 part by weight of one or more selected from the group consisting of a heat stabilizer, a light stabilizer, a dye, a pigment, a colorant, a release agent, an antistatic agent, an antibacterial agent, a processing aid, a metal deactivator, a flame retardant, a smoke suppressant, an anti-dripping agent, an anti-friction agent, and an anti-wear agent. Within this range, required physical properties may be implemented without deterioration in the intrinsic physical properties of the thermoplastic resin composition of the present invention.

For example, the thermoplastic resin composition may include an aromatic vinyl polymer in an amount of 0 to 35% by weight, preferably 10 to 35% by weight, more preferably less than 10% by weight, still more preferably less than 5% by weight, most preferably 0% by weight. Within this range, weather resistance may be excellent. In particular, a surface roughness value is significantly reduced, and thus gloss may be even and the product of the thermoplastic resin composition may be soft to the touch.

For example, a method of preparing the thermoplastic resin composition of the present invention includes a step of mixing 100 parts by weight of a base resin including an acrylate-aromatic vinyl compound-vinyl cyanide compound graft copolymer; and 0.5 to 10 parts by weight of a matting agent having a refractive index of 1.46 to 1.53 and a step of preparing pellets at 220 to 280° C. using an extrusion kneader. In this case, the prepared thermoplastic resin composition satisfies Equations 1 and 2 below:

$$G \leq 20 \qquad \text{[Equation 1]}$$

In Equation 1, G denotes the gloss of a sheet having a size of 0.15 T as measured at 60° using a gloss meter.

$$Hz < Tt \qquad \text{[Equation 2]}$$

In Equation 2, Hz and Tt denote the haze (%) and total light transmittance (%) of a sheet having a size of 0.15 T, respectively. In this case, the thermoplastic resin composition may have excellent display readability while having mechanical properties, weather resistance, and processability equal or superior to those of conventional ASA resins, and may be injected using a general mold without a separate etching mold.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 280° C., more preferably 220 to 250° C. In this case, the temperature is the temperature of a cylinder.

Extrusion kneaders commonly used in the art to which the present invention pertains may be used without particular limitation, and a twin-screw extrusion kneader is preferably used.

<Molded Article>

The molded article of the present invention includes the thermoplastic resin composition of the present invention. In this case, display readability may be excellent while maintaining mechanical properties, weather resistance, and processability.

For example, the molded article may be an extrusion-molded article or an injection-molded article, preferably a film or sheet material for hidden displays.

The film or the sheet preferably has a thickness of 0.05 to 0.5 T, more preferably 0.1 to 0.5 T. Within this range, matte properties and display readability may be excellent.

The molded article may be manufactured by extruding or injecting the thermoplastic resin composition of the present invention at a molding temperature of 190 to 250° C., preferably 210 to 240° C. Within this range, the molded article may be manufactured using a general mold without a separate etching mold, and may have excellent matte properties and display readability.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 4 and Comparative Examples 1 to 4 below are as follows.

- A-1) Graft copolymer prepared by emulsion polymerization (50% by weight of a butyl acrylate polymer unit having an average particle diameter of 500 nm, 35% by weight of a styrene-derived unit, 15% by weight of an acrylonitrile-derived unit)
- A-2) Graft copolymer prepared by emulsion polymerization (50% by weight of a butyl acrylate polymer-derived unit having an average particle diameter of 90 nm, 35% by weight of a styrene-derived unit, 15% by weight of an acrylonitrile-derived unit, grafting degree: 30%)
- A-3) Graft copolymer prepared by emulsion polymerization (50% by weight of a butyl acrylate polymer-derived unit having an average particle diameter of 80 nm, 35% by weight of a styrene-derived unit, 15% by weight of an acrylonitrile-derived unit, grafting degree: 40%)

B-1) PMMA resin (weight average molecular weight: 40,000 g/mol, 95% by weight of an MMA-derived unit, 5% by weight of an MA-derived unit)

B-2) PMMA resin (IH830, LG Chemical Co.)

B-3) PMMA resin (weight average molecular weight: 230,000 g/mol, 97% by weight of an MMA-derived unit, 3% by weight of an MA-derived unit)

C-1) SAMMA resin prepared by bulk polymerization (70% by weight of a methyl methacrylate-derived unit, 20% by weight of a styrene-derived unit, 10% by weight of an acrylonitrile-derived unit, weight average molecular weight: 150,000 g/mol)

C-2) SAMMA resin prepared by bulk polymerization (70% by weight of a methyl methacrylate-derived unit, 20% by weight of a styrene-derived unit, 10% by weight of an acrylonitrile-derived unit, weight average molecular weight: 70,000 g/mol)

D-1) Crystalline resin (refractive index: 1.53) (PA 66)

D-2) Crystalline resin (refractive index: 1.57) (syndiotactic PA resin)

E) SAN resin (90HR, LG Chemical Co.)

Examples 1 to 4 and Comparative Examples 1 to 4

Figure 3:
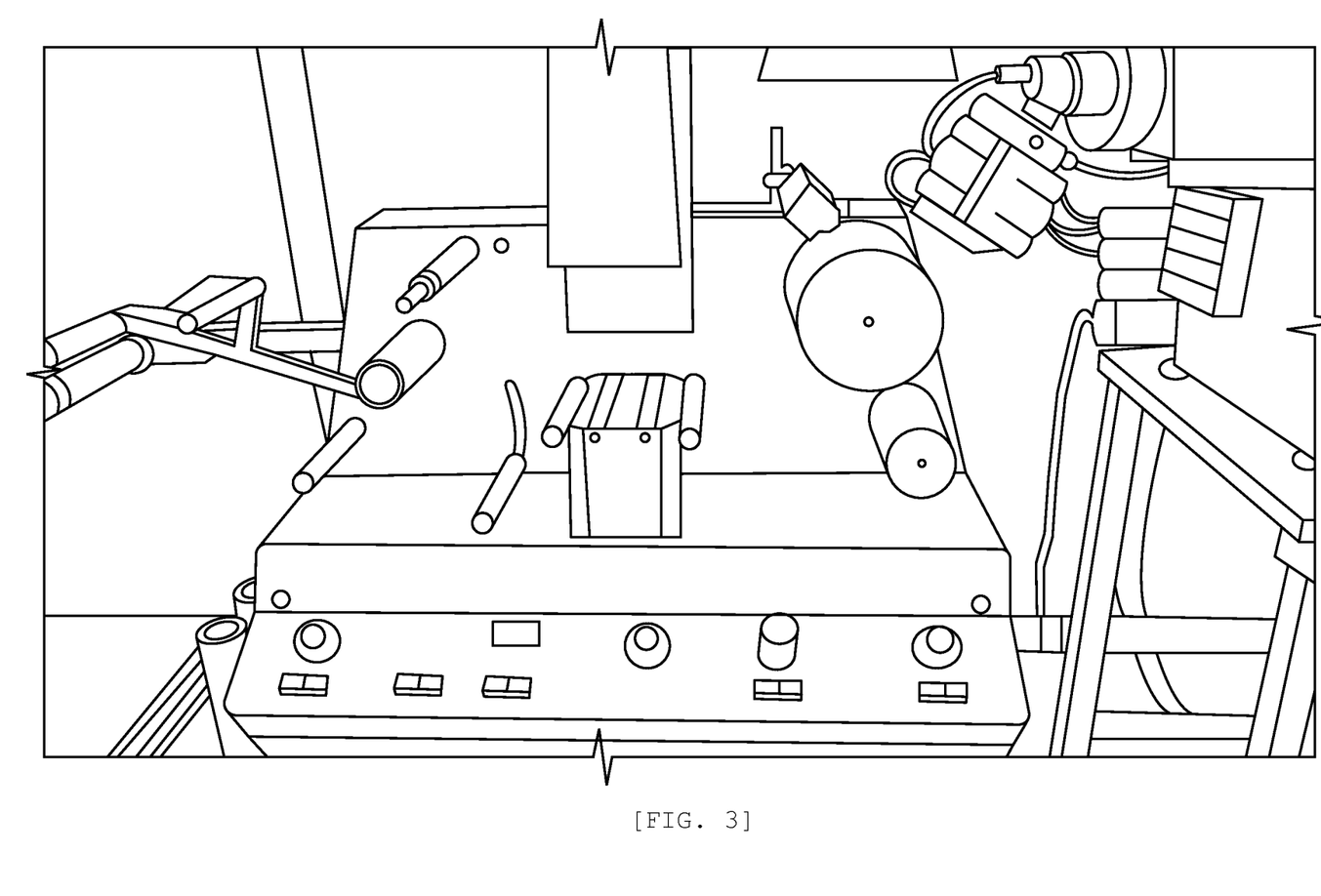
FIG. 3 is an image of a film extruder used in examples.

According to the components and contents shown in Table 1 below, pellets were prepared at 280° C. using a 36 pi extrusion kneader (a twin-screw extruder), a sheet with a uniform thickness of 0.15 T was prepared from the pellets using a film extruder, and the physical properties of the prepared sheet, such as haze (Hz), total light transmittance (Tt), readability, sheet gloss, and surface roughness (Ra), were measured according to the following measurement methods. At this time, a single-screw extruder for sheet molding (model: E20T, 20 pi, L/D:25, Collin Co.) was used as the film extruder, and temperature conditions were set as follows: barrel temperatures of 50, 200, 210, and 210° C. and die temperatures of 220, 220, and 230° C. in order from the inlet of the extruder. The pellets were sufficiently dried in an oven at 80° C. for 3 hours or more to eliminate the effect of moisture, and then were fed into the film extruder through the inlet of the film extruder to prepare a sheet with a uniform thickness of 0.15 T. The temperature of a rear roller was set to 85° C. using water as a medium, and as shown in FIG. 3, the roller was configured such that only one side of a resin extruded through a T-die was in contact with a roll. At this time, the screw RPM of the film extruder was fixed to 100, and the linear velocity of the roll was adjusted so that the film had a thickness of 0.15 T. At this time, the haze (Hz), total light transmittance (Tt), readability, sheet gloss, and surface roughness (Ra) of a surface in contact with the first roll among extruded film surfaces were measured. For reference, when measuring with a surface not in contact with the first roll, a difference may occur in surface roughness.

In addition, the prepared pellets were injected at a molding temperature of 220° C. to obtain a specimen for measuring physical properties, and the impact strength, elongation, hardness, and injection gloss of the specimen were measured.

Test Examples

The properties of sheets and specimens prepared in Examples 1 to 4 and Comparative Examples 1 to 4 were measured according to the following methods, and the results are shown in Table 1 below.

Melt index (MI): Melt index was measured using the prepared pellets under conditions of 220° C./10 kg according to ASTM D1238 (unit: g/10 min).

Izod impact strength (kg·cm/cm): Izod impact strength was measured according to ASTM 256.

Elongation: Elongation was measured according to ASTM D638.

Hardness: Hardness was measured according to ASTM D785.

Injection gloss (3.175 T): Injection gloss was measured at 45° using a gloss meter VG7000.

Sheet gloss (0.15 T): Sheet gloss was measured at 60° using a gloss meter VG7000.

Readability (R): Brightness was calculated using the RGB values of a captured image and a Microsoft Paint tool. With reference to FIG. 1 below, brightness values measured according to locations were displayed, and a graph showing changes in brightness according to locations was obtained. Based on the graph, readability was calculated by Equation 3 below. In Equation 3, Rc denotes the area of a brightness peak measured under conditions of width of number stroke: 2 mm, final light quantity: 14 lux, LED light source: 150 lm/W, distance between light source and sheet: contact, and sheet thickness: 0.15 T, and Ro denotes the area of a theoretical brightness peak. The brightness values are in a range of 0 to 240, 0 means black, and 240 means white. Referring to the graph of FIG. 1 showing changes in brightness according to locations, when the theoretical peak area is 1, the normal peak area of a sample with good display readability is 1.2, and the peak area (red) of a sample with poor display readability is 1.5. As an area value increases compared to the theoretical peak area, display readability decreases. That is, in the case of severe light bleeding, display readability is poor.

$$R = Rc/Ro \qquad \text{[Equation 3]}$$

Total light transmittance (Tt) and haze (Hz): Total light transmittance and haze were measured according to ASTM D1003. Specifically, the light transmittance and haze of a sheet specimen were measured at a temperature of 23° C. using a haze meter (model name: HM-150, MURAKAMI Co.) according to ASTM D1003.

TABLE 1

| Parts by weight | Examples | | | | Comparative Examples | | | |
|---|---|---|---|---|---|---|---|---|
| | 1 | 2 | 3 | 4 | 1 | 2 | 3 | 4 |
| A-1 | | | | 20 | | | 30 | 55 |
| A-2 | | 60 | | | 60 | | 20 | |
| A-3 | 45 | | 55 | | | 55 | | |
| B-1 | | 20 | 10 | | 20 | 10 | | |
| B-2 | 20 | | | | | | | |

TABLE 1-continued

| Parts by weight | | Examples | | | | Comparative Examples | | | |
|---|---|---|---|---|---|---|---|---|---|
| | | 1 | 2 | 3 | 4 | 1 | 2 | 3 | 4 |
| | B-3 | | | 15 | 40 | | 15 | | |
| | C-1 | | | | 40 | | | 20 | |
| | C-2 | 35 | 30 | 30 | | 20 | 20 | 30 | |
| | D-1 | 3 | 4 | 5 | 3 | | | | |
| | D-2 | | | | | | | 5 | |
| | E | | | | | | | | 45 |
| Injection properties (3.175 T) | Impact | 6.9 | 5.1 | 4.0 | 4.6 | 10.1 | 8.8 | 6.9 | 30.3 |
| | Elongation | 32 | 34 | 38 | 29 | 57 | 66 | 24 | 138 |
| | Hardness | 95 | 78 | 90.9 | 116 | 77 | 86.3 | 79.6 | 89.1 |
| | Gloss | 42 | 36.7 | 39.0 | 23.1 | 92.8 | 95.5 | 39.6 | 79.5 |
| | Melt index | 17.2 | 12.0 | 12.1 | 11.7 | 13.0 | 13.7 | 10.8 | 6.2 |
| Sheet properties (0.15 T) | Tt | 90.5 | 87.8 | 88.7 | 88.4 | 88.8 | 89.5 | 80.4 | 65.5 |
| | Hz | 82.8 | 88.1 | 85.0 | 87.9 | 8.1 | 6.5 | 94.7 | 77.3 |
| | Readability | Good | Good | Good | Good | Good | Good | Poor | Poor |
| | | 1.217 | 1.317 | 1.262 | 1.304 | 1.171 | 1.165 | 1.564 | Opaque |
| | Sheet gloss | 15.2 | 13.4 | 11.1 | 7.8 | 109.3 | 124.9 | 6.3 | 59.4 |

Figure 2:
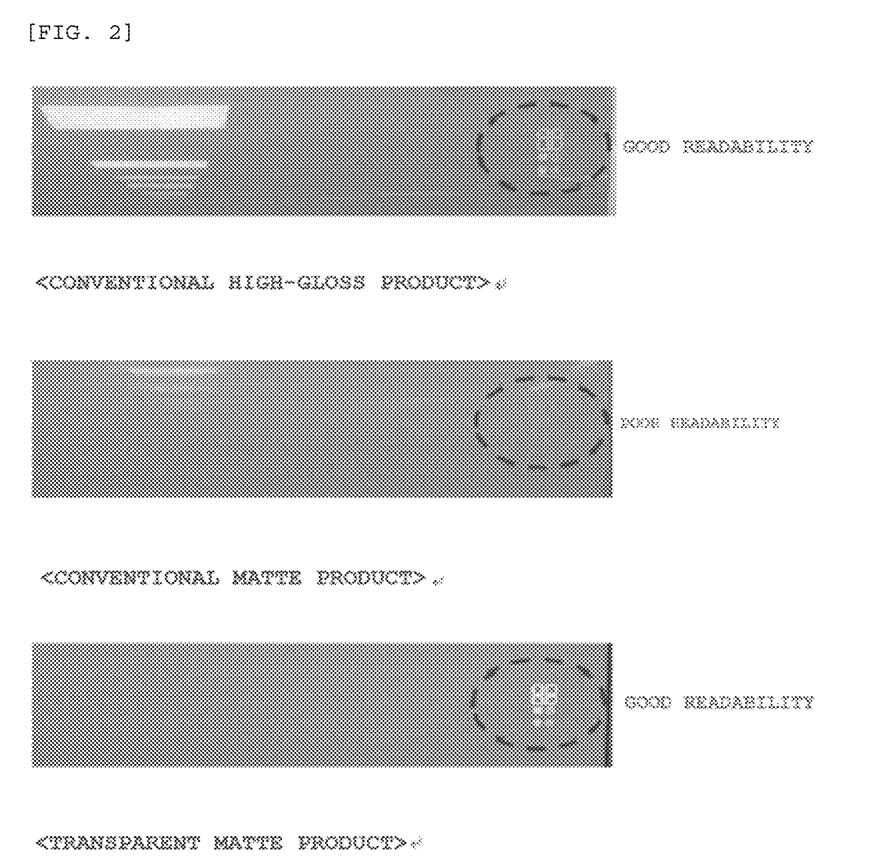
FIG. 2 includes images each showing an air conditioner with the display thereof turned on, and shows that the display readability of an air conditioner according to the present invention is excellent. The top image shows a conventional high-gloss air conditioner, the middle image shows a conventional matte air conditioner, and the bottom image shows the air conditioner according to the present invention.

As shown in Table 1, it can be confirmed that the thermoplastic resin compositions (see Examples 1 to 4 and the bottom image of FIG. 2) according to the present invention have excellent weather resistance, matte properties, and display readability while having mechanical properties, such as impact strength and processability, equal or superior to those of the thermoplastic resin compositions of Comparative Examples 1 to 4, which do not follow the equations related to sheet gloss, haze (%), and total light transmittance (%) according to the present invention. In particular, due to excellent matte properties, the thermoplastic resin compositions according to the present invention may provide a natural, soft, and luxurious feeling. In addition, referring to FIG. 2, the conventional high-gloss air conditioner (see the top image) has good display readability, but has an artificial plastic feel. The conventional air conditioner (see the middle image) having a matte exterior so as not to have such an artificial plastic feel has very poor display readability. On the contrary, the matte air conditioner (see the bottom image) according to the present invention has a natural and luxurious matte exterior, and has excellent display readability.

The invention claimed is:

1. A thermoplastic resin composition, comprising 100 parts by weight of a base resin comprising an acrylate-aromatic vinyl compound-vinyl cyanide compound graft copolymer; and from 0.5 to 10 parts by weight of a matting agent having a refractive index of from 1.46 to 1.53, wherein the thermoplastic resin composition satisfies Equations 1 and 2 below:

$$G \leq 20, \quad \text{[Equation 1]}$$

wherein G denotes a gloss of a sheet having a size of 0.15 T as measured at 60° using a gloss meter, $$Hz < Tt, \quad \text{[Equation 2]}$$

wherein Hz and Tt denote haze (%) and total light transmittance (%) of a sheet having a size of 0.15 T, respectively.

2. The thermoplastic resin composition according to claim 1, wherein the thermoplastic resin composition has a readability (R) of from 1 to 1.4 as measured by Equation 3 below:

$$R = Rc/Ro, \quad \text{[Equation 3]}$$

wherein Rc denotes an area of a brightness peak measured under conditions of width of number stroke: 2 mm, final light quantity: 14 lux, LED light source: 150 lm/W, distance between light source and sheet: contact, and sheet thickness: 0.15 T, and Ro denotes an area of a theoretical brightness peak without light leak.

3. The thermoplastic resin composition according to claim 1, wherein the base resin comprises from 10 to 70% by weight of the acrylate-aromatic vinyl compound-vinyl cyanide compound graft copolymer, and the base resin further comprises from 5 to 50% by weight of a polymethacrylate-based resin, and from 10 to 50% by weight of a methacrylate-aromatic vinyl compound-vinyl cyanide compound copolymer.

4. The thermoplastic resin composition according to claim 1, wherein the total light transmittance (Tt) is from 80 to 95%, and the haze (Hz) is from 1 to 90%.

5. The thermoplastic resin composition according to claim 1, wherein the acrylate-aromatic vinyl compound-vinyl cyanide compound graft copolymer comprises one or more selected from the group consisting of an acrylate-aromatic vinyl compound-vinyl cyanide compound graft copolymer (i) having a grafting degree of 40% or more and containing from 40 to 60% by weight of acrylate rubber having an average particle diameter of from 0.05 to 0.15 μm, an acrylate-aromatic vinyl compound-vinyl cyanide compound graft copolymer (ii) having a grafting degree of less than 40% and containing from 40 to 60% by weight of acrylate rubber having an average particle diameter of from 0.05 to 0.15 μm, and an acrylate-aromatic vinyl compound-vinyl cyanide compound graft copolymer (iii) containing from 40 to 60% by weight of acrylate rubber having an average particle diameter of from 0.33 to 0.5 μm.

6. The thermoplastic resin composition according to claim 5, wherein, based on 100% by weight of the base resin, the acrylate-aromatic vinyl compound-vinyl cyanide compound graft copolymer (i) is present in an amount of from 30 to 60% by weight, the acrylate-aromatic vinyl compound-vinyl cyanide compound graft copolymer (ii) is present in an amount of from 35 to 65% by weight, and the acrylate-aromatic vinyl compound-vinyl cyanide compound graft copolymer (iii) is present in an amount of from 5 to 30% by weight.

7. The thermoplastic resin composition according to claim 3, wherein the polymethacrylate-based resin comprises from 65 to 80% by weight of methacrylate and from 20 to 35% by weight of a vinyl cyanide compound.

8. The thermoplastic resin composition according to claim 3, wherein the polymethacrylate-based resin has a weight average molecular weight of from 50,000 to 200,000 g/mol.

9. The thermoplastic resin composition according to claim 3, wherein the polymethacrylate-based resin comprises one or more selected from the group consisting of a polymethacrylate-based resin (a) having a weight average molecular weight of from 30,000 to 90,000 g/mol, a polymethacrylate-based resin (b) having a weight average molecular weight of from 100,000 to 200,000 g/mol, and a polymethacrylate-based resin (c) having a weight average molecular weight of greater than 200,000 g/mol and less than or equal to 300,000 g/mol.

10. The thermoplastic resin composition according to claim 9, wherein, based on 100% by weight of the base resin, the polymethacrylate-based resin (a) is present in an amount of from 5 to 30% by weight, the polymethacrylate-based resin (b) is present in an amount of from 5 to 30% by weight, and the polymethacrylate-based resin (c) is present in an amount of from 10 to 50% by weight.

11. The thermoplastic resin composition according to claim 3, wherein the methacrylate-aromatic vinyl compound-vinyl cyanide compound copolymer comprises from 65 to 85% by weight of methacrylate, from 10 to 30% by weight of an aromatic vinyl compound, and from 5 to 10% by weight of a vinyl cyanide compound.

12. The thermoplastic resin composition according to claim 3, wherein the methacrylate-aromatic vinyl compound-vinyl cyanide compound copolymer has a weight average molecular weight of from 80,000 to 200,000 g/mol.

13. The thermoplastic resin composition according to claim 1, wherein the matting agent includes a polyamide resin having a refractive index of from 1.46 to 1.53.

14. A molded article, comprising the thermoplastic resin composition according to claim 1.

15. The molded article according to claim 14, wherein the molded article is a film or sheet material for hidden displays.

16. The molded article according to claim 15, wherein the film or the sheet has a thickness of from 0.05 to 0.5 T.

* * * * *